3,623,320
DUAL SOURCE HYDROSTATIC DRIVE
Sammy R. Moore, Lubbock, Tex., assignor to
Clark Equipment Company
Filed Feb. 9, 1970, Ser. No. 9,803
Int. Cl. F15b *15/18*; F16h *39/02*
U.S. Cl. 60—52                                              9 Claims

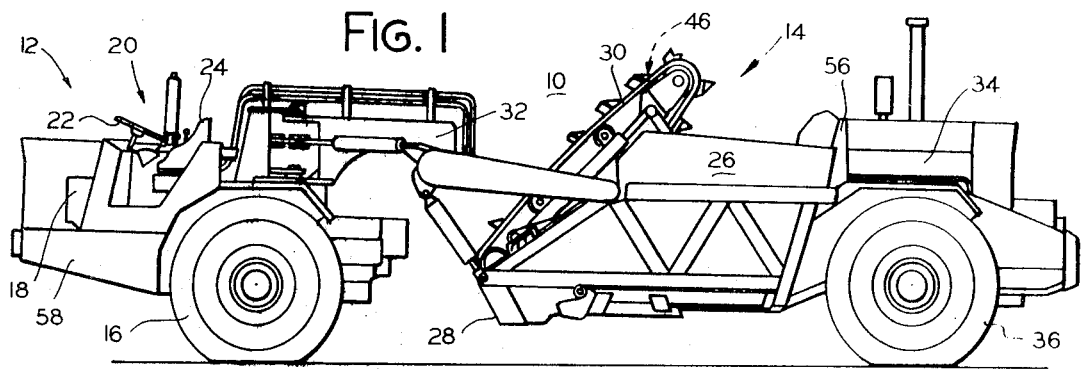
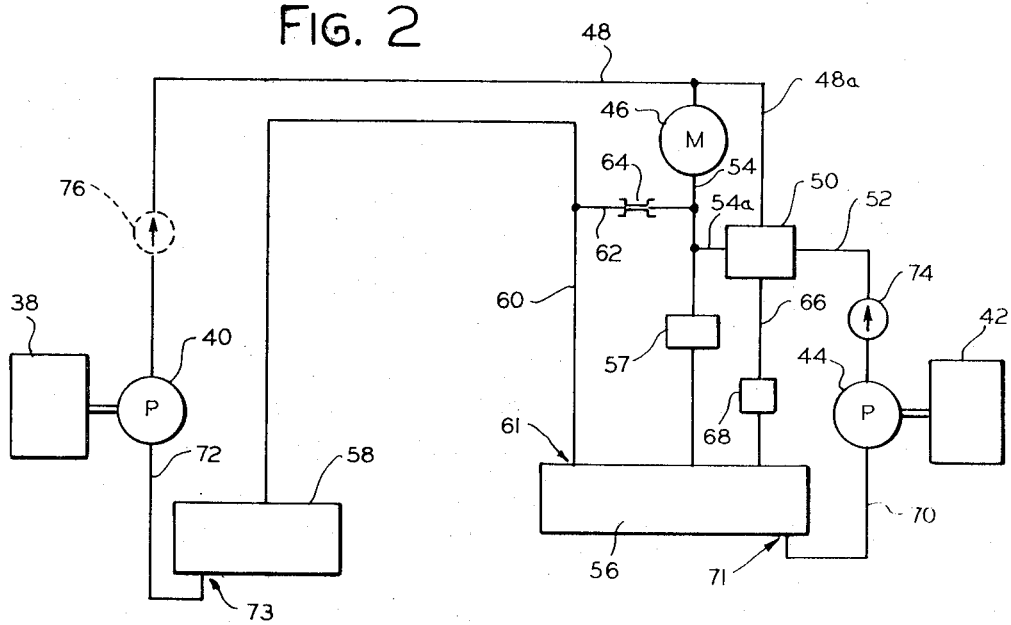
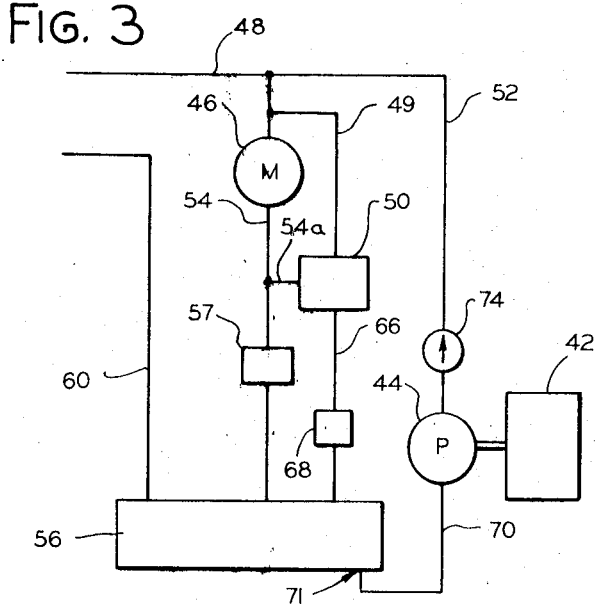

ABSTRACT OF THE DISCLOSURE

A hydrostatic drive for operating a single device jointly from two power sources, including a pair of hydraulic pumps driven respectively by the two power sources and a hydraulic motor for driving the device. Two reservoirs are provided along with a bypass valve and the necessary conduits so arranged as to provide high efficiency in the operation of the single hydraulic motor jointly by the two hydraulic pumps.

BACKGROUND OF THE INVENTION

Field of the invention

This invention relates to a hydrostatic drive in which the liquid output of two hydraulic pumps is utilized jointly to drive a single hydraulic motor. The invention is particularly useful on a two-engine vehicle as disclosed herein in which it is desired that both of the engines also operate an auxiliary device on the vehicle, but it will be readily appreciated that the invention is not limited to such usage.

Description of the prior art

In certain situations it is desired to operate a single device jointly from two power sources, and an example of this is a two-engine scraper having an elevator loading mechanism. On such vehicles it is desirable that all of the power which is available from both engines be utilized most efficiently to drive the vehicle or both the vehicle and the elevator, depending upon whether the vehicle is loading or traveling. Patent 3,443,379, dated May 13, 1969, deals with the same problem but the present invention provides a simpler, lower cost, more efficient solution.

SUMMARY OF THE INVENTION

In carrying out my invention in one preferred form thereof I provide a single hydraulic motor arranged to be operated jointly by pressurized hydraulic fluid received from two pumps driven by separate power sources. Pressure conduit means are provided interconnecting the outlets of the two pumps with the inlet of the motor and also with a bypass valve. Discharge conduit means are provided interconnecting the outlet of the motor and the bypass valve with one of two reservoirs. An additional reservoir is provided and an additional conduit interconnects the two reservoirs.

BRIEF DESCRIPTION OF THE DRAWING

FIG. 1 shows a small somewhat diagrammatic side elevational view of a two-engine elevating scraper embodying the present invention, FIG. 2 shows schematically one preferred embodiment of the hydrostatic drive of this invention, and FIG. 3 shows schematically a fragmentary portion of another preferred embodiment of the hydrostatic drive of this invention.

DESCRIPTION OF THE PREFERRED EMBODIMENTS

The numeral 10 in FIG. 1 designates generally an articulated vehicle composed of a two-wheeled tractor portion 12 and a two-wheeled trailer portion 14. The tractor portion 12 includes a pair of rubber-tired wheels (only one of which is visible) mounted at the outer ends of a transverse drive axle, an internal combustion engine 38 or other prime mover (not visible) within an enclosure 18, an operator's station 20 including a steering wheel 22 and a seat 24, and the controls necessary for operating the vehicle.

The trailer portion of the vehicle is in the form of a scraper for loading, transporting, and unloading earth or other material, and includes a main bowl or box portion 26 having a cutting edge at 28, an endless chain elevator 30 for moving material from the cutting edge upwardly and rearwardly into the box portion, and other parts including a yoke or gooseneck portion 32 for connecting the trailer 14 to the tractor 12. The trailer portion 14 also includes a second internal combustion engine 42 or other prime mover within enclosure 34 and a pair of rubber-tired wheels 36 (only one of which is visible) mounted at the outer ends of a rear drive axle.

Under many operating conditions it is desirable to operate the elevator 30 from both of the engines at the same time that the said two engines are driving the front and rear wheels respectively, in order to utilize all available power for loading the vehicle in order to accomplish such loading in the minimum time. In FIGS. 2 and 3 I have illustrated two hydrostatic drive arrangements in which such operation can be accomplished in a simple, effective and very efficient manner.

In FIG. 2 there is shown schematically an engine 38 which is located in the enclosure 18 on the tractor portion of the vehicle and in addition to driving the front wheels 16 it also drives a pump 40 which may, for example, be a gear type fixed displacement pump. Another engine 42 is located within the enclosure 34 on the trailer portion of the vehicle and in addition to driving rear wheels 36 it also operates a pump 44 which preferably is the same as pump 40 or at least is of the same pressure rating. It is also desirable that the engines should be of similar size, although one of the advantages of this invention is that it will operate to transmit whatever energy is available from either or both of the engines to the motor driving the elevator as long as the hydraulic system is operating within the normal pressure range. It will be understood that the two engines ordinarily are operated in synchronism so that the respective pairs of wheels which they drive also operate in synchronism, but even such synchronism by the engines is not essential insofar as the operation of the present invention is concerned.

The motor 46 shown in FIG. 2 is a hydraulic motor which operates the elevator 30 shown in FIG. 1. Motor 46 may be, for example, of the fixed displacement gear type. The motor 46 receives hydraulic fluid under pressure from two sources, one from pump 40 through a conduit 48 which is connected to the inlet of the elevator motor and also to a bypass valve 50. The other source is from pump 44 which discharges hydraulic fluid under pressure through a conduit 52 which is connected between the outlet of the pump 44 and bypass valve 50. When bypass valve 50 is closed, pressurized fluid flows in the reverse direction through section 48a (that is, upwardly in FIG. 2) of conduit 48 and joins the fluid coming from pump 40 in flowing into the inlet of motor 46.

After flowing through the motor 46 the fluid passes into discharge conduit 54 and most of it flows into closed reservoir 56 through an intervening filter 57. Reservoir 56 is located on the rear portion of the vehicle but it is connected to another reservoir 58 on the front portion of the vehicle by an intervening conduit 60 through which hydraulic fluid flows from the reservoir 56 to the reservoir 58. Interconnected between conduits 54 and 60 is a conduit 62 which permits the discharge of a portion of the fluid leaving motor 46 directly to conduit 60 and thence into reservoir 58. Conduit 62 is provided with a restriction 64 as indicated to restrict the flow through this conduit to a minor portion of the total flow from the motor so that the major portion must flow into reservoir 56.

When it is desired not to operate the elevator motor 46 as, for example, during the time that vehicle 10 is traveling from the loading site to the place where its load is to be discharged, valve 50 is open, and this is the normal position of such valve. Valve 50 is of a known pilot operated type. It remains open as long as a small amount of the hydraulic fluid is allowed to flow through a conduit 66 and to the hydraulic tank 56, but as soon as solenoid valve 68 is operated in response to the operation of a suitable switch by the operator of the vehicle and the flow is cut off in line 66, valve 50 closes. When valve 50 is open the hydraulic fluid from both pumps flows through the valve 50 and through a conduit section 54a into the main discharge conduit 54 and thence into reservoir 56, with a portion of the flow passing through conduit 62 as described previously for the condition when the elevator motor is operating. Valve 50 also serves as a relief valve in the event the fluid pressure should exceed a predetermined amount such as 2,000 pounds per square inch.

It is believed that it will be readily understood from the foregoing that valve 50 normally is open and pump 44 under such condition circulates hydraulic fluid through conduit 52, valve 50, discharge conduit section 54a, conduit 54, reservoir 56, and conduit 70 back to the inlet of the pump 44. At the same time pump 40 circulates hydraulic fluid from its outlet through conduit 48 and conduit section 48a, through the bypass valve 50 and discharge conduit section 54a from which a portion of it flows through tank 56 and the conduit 60 and the remainder through line 62 into conduit 60. From conduit 60 such fluid is returned to tank 58 and then flows through conduit 72 back to the inlet of pump 40.

Such an arrangement minimizes the efficiency losses in the hydraulic system because there is a minimum number of valves and other devices in the circuit, and in addition the pump 44, valve 50, elevator motor 46 and reservoir 56 are all located in close proximity to each other which further minimizes the losses in this portion of hydrostatic drive system. This system may, for example, operate at a pressure approaching 2,000 pounds per square inch and at pressures of this magnitude losses caused by the flow of the highly pressurized fluid through various devices can become substantial as will be appreciated by those skilled in the art.

Valve 74 is a one-way valve which has been included in conduit 52 to prevent the pump 40 from driving pump 44 in the reverse direction and thereby driving the engine 42 in the reverse direction in the event that engine 42 is is not operating for any reason, when it is desired to operate motor 46, because such operation could be damaging to the engine 42. It would also be possible to put a one-way valve 76 indicated by dashed lines in the discharge from pump 40 if desired, but this ordinarily is not necessary because the engine 38 is located immediately adjacent the operator of the vehicle and he can thereby determine readily if engine 38 should die or for any other reason is not running, and take appropriate action to prevent damage to the engine 38.

FIG. 3 shows another embodiment of the invention in which discharge conduit 52 from pump 44 is connected directly to discharge conduit 48 from pump 40, and the bypass valve 50 is then connected by means of a conduit 49 to bypass the hydraulic fluid from both of the pumps except when it is desired to operate the elevator motor 46. Also conduit 62 is eliminated.

Schematically, the hydrostatic drive of FIG. 3 may appear to be simpler than that of FIG. 2, but because of the arrangement of the particular vehicle 10 of FIG. 1 the embodiment of FIG. 2 requires less conduits and hence helps minimize friction losses. The remainder of FIG. 3 is the same as FIG. 2. It will be appreciated that in FIG. 2 the connection between conduits 48a and 52 is open and unimpeded through bypass valve 50.

In the vehicle illustrated in FIG. 1, the reservoir 58 on the front of the vehicle is at a lower elevation than reservoir 56 on the rear portion of the vehicle, when the vehicle is level. See FIG. 1 for an indication of the locations of these two reservoirs. Nevertheless it is possible to check the amount of hydraulic fluid in the entire system merely by checking front tank 58 because the hydraulic fluid will not run from tank 56 over to tank 58 when an opening in the latter tank is uncovered because reservoir 56 is only a few feet higher than reservoir 58 and this is not high enough to cause the fluid to siphon from reservoir 56 to reservoir 58 and draw a vacuum in the former reservoir. Reservoir 56 always is completely filled with hydraulic fluid during operation and normally operates at a few pounds pressure, that is, less than 25 pounds per square inch, and this is determined by the amount of restriction 64 in conduit 62.

Actually, it will be appreciated by those skilled in the art that it is not necessarily required to have separate "restriction" in conduit 62 in the embodiment of FIG. 2. The same result can be achieved by utilizing a conduit of smaller diameter. The point here is that it is desired to make certain that rear reservoir 56 is completely filled at all times, whether it is above or below the other reservoir, and so conduit 62 is sized to force a small portion of the amount of fluid discharge from pump 40 (along with all of the amount discharged from pump 44) to go into the rear reservoir either through motor 46 or through the bypass valve 50 at all times during operation. It will be observed that the discharge connection 61 from reservoir 56 is on the top of the reservoir and also that the discharge connection 71 for the conduit supplying pump 46 is on the bottom of this reservoir. Similarly, the discharge connection 73 on reservoir 58 is on the bottom of such reservoir.

Putting discharge connection 61 on the top of reservoir 56, of course, assures that any gas or vapor that may get in the system will be discharged from reservoir 56, while the connections 71 and 73 respectively assure that the pumps 44 and 40 always will be pulling oil into the pump inlet from the bottom of their respective reservoirs where there is certain to be liquid if there is any liquid in the system at all.

In the broader aspects of this invention, conduit 62 between conduits 54 and 60 can be eliminated and all of the liquid discharged from the motor 46 or passing through the bypass valve 50 discharged into the reservoir 56 from which it separates and goes through conduits 70 and 60 to the respective pumps. This arrangement may be advantageous in some cases, but in the particular vehicle illustrated, it is more advantageous to utilize conduit 62 as a partial bypass of the liquid from motor 46 which came from pump 40 so that such liquid will not have to flow all the way back to the rear reservoir 56 and then again be returned to the front reservoir. It will be seen from the arrangement of the various parts in FIG. 1 that motor 46, which is on the far side of the upper end of elevator 30 is between the two reservoirs.

While I have described and illustrated two preferred embodiments of my invention, it will be appreciated that modifications may be made. Accordingly, it should be understood that I intend to cover by the appended claims all such modifications falling within the true spirit and scope of my invention.

I claim:

1. A hydrostatic drive for operating a single device jointly from two power sources comprising, a first hydraulic pump driven by one of the power sources, a second hydraulic pump driven by the other power source, a hydraulic motor for driving the said device, a bypass valve, a first reservoir, a second reservoir, pressure conduit means interconnecting the outlets of both said pumps with the inlet of the said motor and the said bypass valve, discharge conduit means interconnecting the outlet of the said motor and the said bypass valve to the said second reservoir, and an additional conduit interconnecting the said second reservoir and the said first reservoir.

2. A hydrostatic drive as specified in claim 1 in which the said pressure conduit means interconnecting the outlets of the said pumps with the inlet of the said motor and the said bypass valve comprises first conduit means connecting the outlet of the said first pump to the inlet of the said motor and to the said bypass valve and second conduit means connecting the outlet of the said second pump to the said bypass valve.

3. A hydrostatic drive as specified in claim 1 in which the said pressure conduit means interconnecting the outlets of both said pumps with the inlet of the said motor and the said bypass valve comprises first conduit means connecting the outlets of both said pumps to the inlet of said motor and second conduit means connecting the said first conduit means to the said bypass valve.

4. A hydrostatic drive as specified in claim 1 in which there is a restricted flow conduit connection between the said discharge conduit means and the said additional conduit.

5. A hydrostatic drive as specified in claim 2 in which the said pressure conduit means includes a one-way valve for one of the said pumps.

6. A hydrostatic valve as specified in claim 2 in which the said pressure conduit means includes a one-way valve for each of the said pumps.

7. A hydrostatic drive for a two-engine elevating scraper for operating the elevator from both engines, one of the engines being located adjacent one end of the vehicle and the other engine adjacent the other end of the vehicle, the hydrostatic drive comprising a first hydraulic pump driven by a first one of the said engines, a second hydraulic pump driven by the other of the said engines, a hydraulic motor for driving the said elevator, a bypass valve, a first reservoir adjacent the engine driving the said first pump, a second reservoir adjacent the engine driving the said second pump, pressure conduit means interconnecting the outlets of both said pumps with the inlet of the said motor and the said bypass valve, discharge conduit means interconnecting the outlet of the said motor and the said bypass valve to the said second reservoir, and an additional conduit interconnecting the said second reservoir and the said first reservoir.

8. A hydrostatic drive as specified in claim 7 in which there is a conduit connected between the said first reservoir and the inlet of the said first pump and another conduit connected between the said second reservoir and the inlet of the said second pump.

9. A hydrostatic drive as specified in claim 7 in which the said second reservoir is located at a greater height than the said first reservoir when the vehicle is level.

References Cited

UNITED STATES PATENTS

| 2,103,530 | 12/1937 | Henry | 60—52 HE X |
|---|---|---|---|
| 3,222,865 | 12/1965 | Miller | 60—52 HE X |
| 3,222,866 | 12/1965 | Lehmann | 60—52 HE X |
| 3,443,379 | 5/1969 | Weisenbach | 60—53 X |
| 3,443,380 | 5/1969 | Karazija | 60—52 HE |

EDGAR W. GEOGHEGAN, Primary Examiner

U.S. Cl. X.R.

60—53 R